Feb. 24, 1931.    G. C. THOMAS, JR    1,793,880
CABLE CONNECTER
Filed July 26, 1926
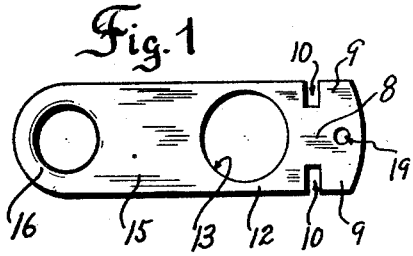
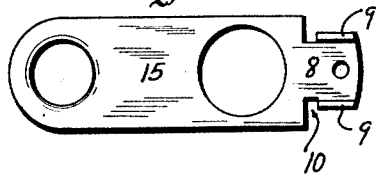
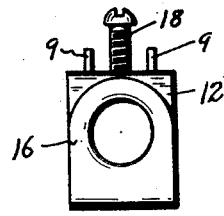 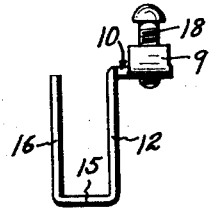 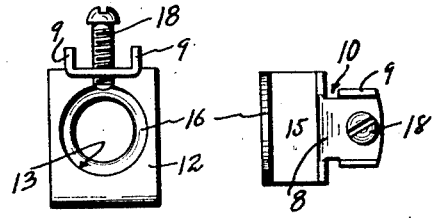
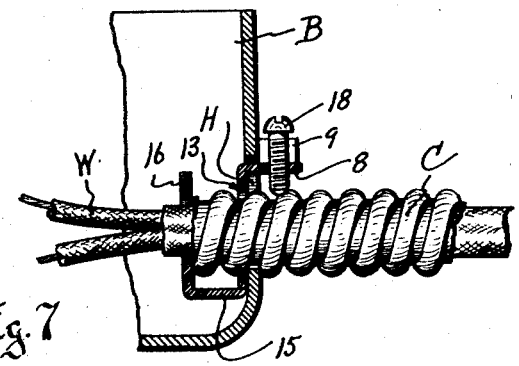
INVENTOR
George C. Thomas, Jr.
BY
ATTORNEYS Patented Feb. 24, 1931

1,793,880

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed July 26, 1926. Serial No. 124,819.

This invention relates to cable box and connecting means and more particularly to improved connecters for attaching cable to electric fixture boxes and the like.

An object of the invention is to produce an improved cable connecter of the type which leaves exposed a part of the box hole edge and which is capable of anchoring itself and a cable to the box hole edge without screw fastening means directly connected with or extending through the box; and furthermore it is an object to improve the anchorage means by which the connecter is secured in the box hole and to improve the bushing means by which the wire is protected and guided at the ragged cable end.

The accompanying drawings show an example of the invention serving to explain its principle, construction and mode of application to an electric fixture box.

Figure 1 shows a plan view of the connecter stamping before it is subjected to the necessary bending operations.

Figure 2 shows the same stamping but having its abutment ears struck up at right angles to the stamping.

Figure 3 shows an elevation of the inner end or bushing end of the connecter.

Figure 4 shows a side view of the connecter.

Figure 5 shows an outside elevation of the connecter.

Figure 6 shows a plan view of the connecter.

Figure 7 shows an assembly view of the connecter anchoring a cable in the box hole.

Electric fixture boxes B are made with cable and connecter receiving holes H into which the cable C is introduced and anchored by use of the connecter hereinafter described.

A cable connecter constructed in accordance with the principles of this invention embodies a flat plate stamping having a portion sufficiently small to fit into a box hole and expose a part of the box hole edge. To this end a connecter plate embodies a narrow portion 8 with abutment ears 9 struck or bent up at right angles thereto. The narrow neck portion 8 extends between box hole edge anchorage means in the form of notches 10 which register with the box hole edge H.

The anchorage means 10 disclosed herein simply shows an example of one suitable form of means to engage or fasten onto the box hole edge by which the connecter is anchored in the box against longitudinal motion. The narrow neck portion 8 is integral with a box wall abutment 12 which is bent at right angles to the portion 8. The abutment 12 includes a cable passage 13 to admit the cable through the connecter. The box wall abutment 12 defines one edge of the notches 10 while the abutment ears 9 define the other edge of the notches. Thus the ears 9 and abutment 12 are spaced apart a distance about equal to the thickness of the box wall B so that when the connecter is placed in the sleeve, the edge of said sleeve seats down into the notches 10.

A support portion 15 is connected at right angles to the abutment 12 and reaches alongside and parallel to the cable C. This support member 15 includes a bushing 16 at right angles to the support member and thus the bushing 16 is held in spaced parallel relation to the abutment 12.

Operating means such as a screw 18 is threaded through the connecter and adapted to produce a reaction by which the notches 10 are forced and positively seated against the box hole edge. In this example of the invention the operating means comprises a screw 18 threaded through a screw hole 19 adjacent the anchorage means 10 and the screw 18 is pointed towards and adapted to bear against and react from the cable C to force the cable against the exposed box hole edge and react to render operative the connecter anchorage means 10.

It is noted that in side elevation the connecter assumes a general inverted U-shaped formation. On one free end of the leg of the U-shaped part there is included a support to carry the operating means, i. e., a screw as mentioned. One leg 12 of the connecter is provided with a cable passage therethrough while the other leg forms a bushing to guide and protect the wires W and to act as a stop against which the rugged end of the cable C comes to rest.

The screw 18 is mounted between the parallel upstanding abutment ears 9 and is placed relatively close to the anchorage means 10, the result of which is to simultaneously grip the cable C against the exposed box hole edge and seat the anchorage means 10 in position against said box hole edge and thus the connecter and the cable are anchored within the box hole and against the edge thereof by a single operating means.

The connecter is inserted in the box hole H with the screw on the outside thereof in this example of the invention and the screw is run down against the cable to anchor the parts in fixed position as shown in the general assembly view Figure 7. The long abutment plate 12 embraces the cable and overlaps the rim of the box hole serving to close that part of the box hole not occupied by the cable, especially where the cable is smaller than the box hole. Furthermore the abutment plate braces the connecter in the box and aids in holding the screw and part 8 in outstanding relation from the box wall outside the box until all parts are tightened up.

What I claim is:

1. A cable and box connecter comprising, a flat plate a portion of which is narrow and is of less width than the diameter of a box hole and formed to expose a part of the box hole edge directly to the cable, box hole edge anchorage means included on the narrow portion engaging the box wall in the hole, an abutment included at right angles on the narrow portion resting against the box wall and including a cable passage through which the cable extends into the box, a support portion included at right angles to and projecting from the end of the abutment opposite to the anchorage means and reaching alongside the cable, and a bushing included on the outer end of the support portion through which the wires of the cable pass and against which the cable stops, a screw support integral with the aforesaid narrow portion and projecting from the box wall, and a screw threaded through the screw support adapted to be pointed toward a cable forcing the cable against the exposed box hole edge and forcing said anchorage means against said box hole edge.

2. A cable connecter comprising a flat plate having a narrow part small enough to fit in a box hole and leave a part of its edge exposed, box hole edge anchorage means on the narrow part, said anchorage means consisting of lugs bent at right angles to the narrow part, a screw threaded through the narrow part of the connecter adapted to produce a reaction from the cable and force the anchorage means against a box hole edge, an abutment plate provided with a cable passage included at right angles on the narrow part, a support included at right angles on the abutment plate, and a bushing included at right angles on the support with its aperture in alignment with said abutment plate cable passage.

3. A cable connecter comprising a flat plate having a narrow part small enough to fit in a box hole and leave a part of its edge exposed, box hole edge anchorage means on the narrow part, said anchorage means consisting of a pair of lugs bent at right angles to the narrow part so as to present an edge of each lug to the box wall, an abutment plate included at right angles to the narrow part and bent in a direction opposite to the direction of the anchorage lugs, a cable passage through the abutment plate, and a screw in the connecter adjacent the anchorage means.

In testimony whereof I affix my signature.

GEORGE C. THOMAS, Jr.